United States Patent [19]

Berecz et al.

[11] Patent Number: 4,546,833

[45] Date of Patent: Oct. 15, 1985

[54] ADJUSTABLE TORQUE RESPONSIVE CONTROL

[75] Inventors: Imre Berecz, El Toro; Dennis L. Hinton, Yorba Linda, both of Calif.

[73] Assignee: Microdot Inc., Darien, Conn.

[21] Appl. No.: 565,232

[22] Filed: Dec. 27, 1983

[51] Int. Cl.[4] .................... B23Q 5/00; F16D 11/04

[52] U.S. Cl. .................................. 173/12; 192/150; 192/0.034; 173/13

[58] Field of Search .................. 192/150, 56 R, 56 L, 192/54, 0.02 R, 0.034; 173/13, 12; 74/99 R; 464/30, 37

[56] References Cited

U.S. PATENT DOCUMENTS

| | | | |
|---|---|---|---|
| 3,195,704 | 7/1965 | Linsker | 192/150 |
| 4,191,282 | 3/1980 | Schoeps | 192/150 |
| 4,265,320 | 5/1981 | Tanaka et al. | 173/12 |
| 4,368,784 | 1/1983 | Wünsch et al. | 173/12 |
| 4,425,988 | 1/1984 | Stock et al. | 192/56 R |
| 4,429,775 | 2/1984 | Teramoto | 192/0.034 |
| 4,488,604 | 12/1984 | Whitehouse | 173/12 |

*Primary Examiner*—Henry C. Yuen
*Attorney, Agent, or Firm*—Lyman R. Lyon

[57] ABSTRACT

The disclosure relates to a torque responsive control system for a powered fastener driving tool having a reciprocable control rod for controlling the supply of power to the motor thereof. The torque responsive system features a plurality of ball pins that extend between front and rear ball pin retainers so as to be movable between a circumferentially extending drive position and an axially extending motor shut down position.

4 Claims, 4 Drawing Figures

ADJUSTABLE TORQUE RESPONSIVE CONTROL

BACKGROUND OF THE INVENTION

This invention relates to a torque responsive control system for a power operated fastener driving tool.

It is often necessary, particularly in the aircraft industry, to set fasteners with a predetermined, substantially uniform torque. The torque responsive control must respond only to a narrow range of torque, thereby to insure integrity of the fastening system. While many torque responsive mechanical systems have been proposed for this purpose, they are generally large and heavy and thus not adaptable to the size and weight restrictions of portable, hand operated, fastener driving tools.

SUMMARY OF THE INVENTION

The adjustable torque responsive control system of the present invention exhibits a high level of repeatability of setting torque.

DETAILED DESCRIPTION OF THE PREFERRED EMBODIMENT OF THE INVENTION

Figure 1:
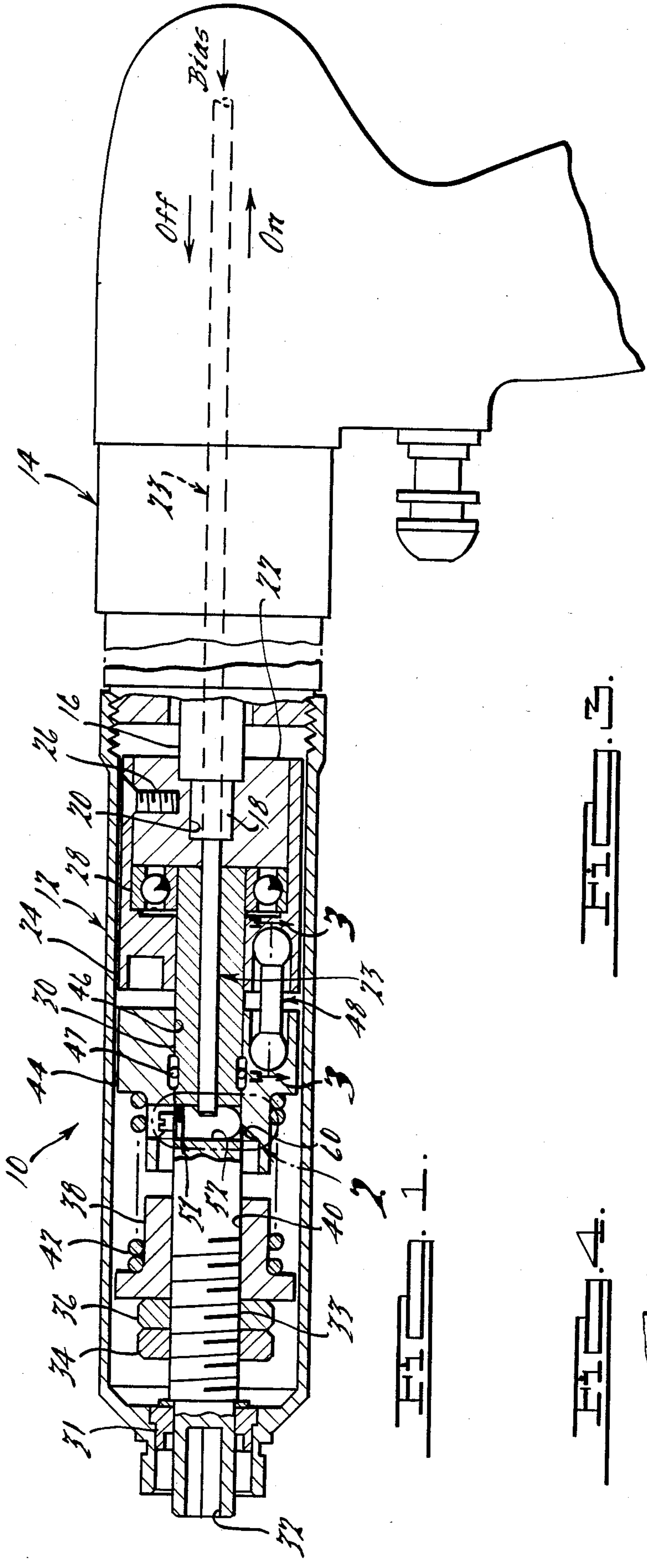
FIG. 1 is a broken longitudinal section through a fastener driving tool incorporating the novel torque responsive control of the present invention with the torque control in the torque sensing or "off" condition.

Referring to FIG. 1 of the drawings, a preferred embodiment of the adjustable torque responsive control 10 of the present invention comprises a housing 12 which carries the entire adjustable torque responsive control assembly. The housing 12 is designed to fit a conventional air or electrically powered drive tool, for example, a Rockwell Model #35F-436 pistol grip tool 14. The tool 14 has a conventional output shaft 16 extending outwardly thereof in axial alignment with the housing 12, a hexagonal end portion 18 thereof being dimensioned to be received in a complementary aperture 20 in a drive bushing 22 of the control assembly 10. A conventional shutoff pin 23 extends interiorly of the motor housing 14. The pin 23 is normally biased outwardly to the off position by an internal switch (not shown).

The drive bushing 22 is attached to a rear ball pin retainer 24 as by a screw 26. A bearing 28 maintains the drive bushing 22, rear ball pin retainer 24, and a drive shaft 30 in coaxial relationship relative to the housing 12. It is to be noted, however, that the drive shaft 30 is freely rotatable relative to the output shaft 16 of the tool 14 and rear ball pin retainer 24.

The drive shaft 30 is also journaled in a bearing 31 at the outboard end of the housing 12, an end portion 32 of the shaft 30 effecting drive of a fastener (not shown). An intermediate portion 33 of the drive shaft 30 is threaded for the acceptance of a pair of adjustable locknuts 34 and 36 that are advanced or retracted to achieve a predetermined torque, as will be described.

A spring stop bushing 38 is positioned by the adjustable locknuts 34 and 36, a central bore 40 thereof accommodating the drive shaft 30. A compression spring 42 extends between the spring stop bushing 38 and a front ball pin retainer 44 to control axial displacement thereof to initiate motor shut down, as will be described. The front ball pin retainer 44 has a central bore 46 for the acceptance of the drive shaft 30 which is keyed for driving thereof by a plurality of balls 47, which, however, permit relative axial movement between the retainer 44 and shaft 30.

In accordance with one feature of the present invention, torque is transmitted from the rear ball pin retainer 24 to the front ball pin retainer 44 by three ball pins 48, only one of which is visible in FIG. 1. The pins 48 extend between sockets 49 and 50 in the front and rear ball pin retainers 44 and 24, respectively, to effect drive between the rear ball pin retainer 24 and the front ball pin retainer 44.

Figure 3:
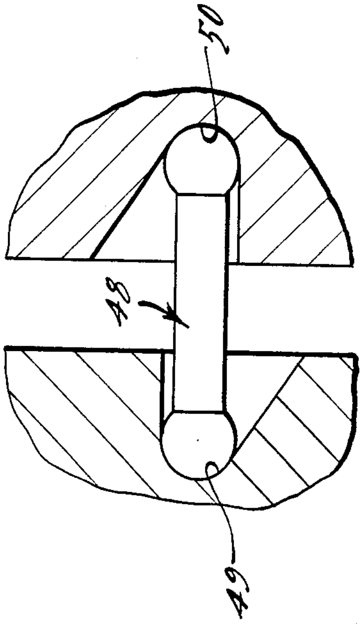
FIG. 3 is a longitudinal section taken along the line 3—3 of FIG. 1, with the torque responsive assembly in the "off" position.
Figure 4:
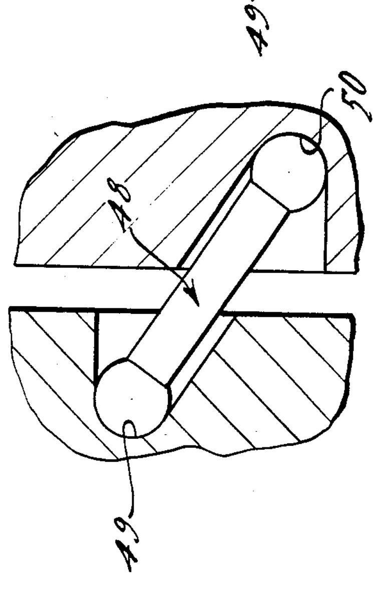
FIG. 4 is a longitudinal section similar to FIG. 3 with the torque responsive assembly in the drive condition.

Upon the occurrence of a predetermined torque applied to a fastener (not shown) the ball pins 48 move from the drive position shown in FIG. 4 to the open or stop position shown in FIG. 3 against the bias of the spring 42. When the front ball pin retainer 44 is driven forwardly it initiates drive motor shut down.

Figure 2:
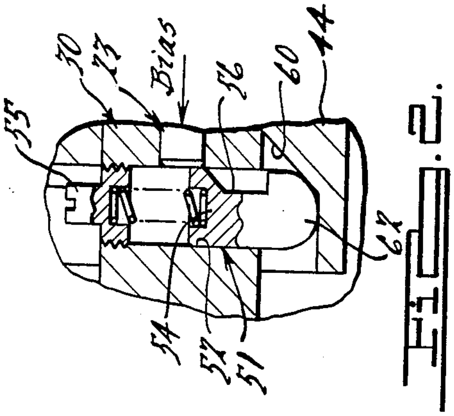
FIG. 2 is a sectional view taken within the circle 2 of FIG. 1 with the control mechanism in the "run" condition.

As best seen in FIG. 2, drive motor shut down is controlled by a mechanical system comprising a laterally movable pawl 51 disposed in a transverse bore 52 in the drive shaft 30. The pawl 51 is biased downwardly by a spring 54 that extends between the pawl 51 and a spring retainer 55. The pawl 51 has a recess 56 for the acceptance of the motor control pin 23.

Movement of the front ball pin retainer 44 from the drive position shown in FIG. 4 to the stop position shown in FIGS. 1 and 3 brings a cam surface 60 thereon into engagement with a complementary nose portion 62 on the pawl 51 to effect lateral movement of the pawl 51 bringing the recess 56 therein into alignment with the shut off pin 23 whereupon the pin 23 moves to the left, as seen in FIGS. 1 and 2, under its normal bias to shut off the motor 14.

From the foregoing description it should be apparent that as torque builds up on a fastener (not shown) the orientation of the ball pins 48 changes from the angular position shown in FIG. 4 to the axially aligned condition shown in FIGS. 1 and 3 driving the retainer 44 forwardly. Forward movement of the retainer 44 effects lateral movement of the pawl 51 permitting the shut off pin 23 to move forwardly to the stop condition within the recess 56 in the pawl 51.

While the preferred embodiment of the invention has been disclosed, it should be appreciated that the invention is susceptible of modification without departing from the scope of the following claims.

I claim:

1. A torque responsive control for a powered fastener driving tool, said tool comprising a motor, a reciprocable control rod for controlling the supply of power to said motor, and an output shaft rotatable by said motor, said torque responsive system comprising, a rear ball pin retainer connected to the output shaft of said motor for rotation therewith, a front ball pin retainer, a plurality of ball pins extending between said front and rear ball pin retainers and movable between a circumferentially extending drive position and an axial shut down position, a drive shaft driven by said front ball pin retainer, a compression spring normally biasing said front ball pin retainer toward said rear ball pin retainer, and means controlled by said front ball pin retainer for controlling the axial position of said control rod.

2. A control in accordance with claim 1 wherein said means comprises a laterally movable pawl.

3. A control in accordance with claim 1 wherein said rear ball pin retainer is movable axially relative to the output shaft of said motor but keyed for rotation therewith.

4. A control in accordance with claim 1 wherein said rear pin retainer is keyed to said motor output shaft by a plurality of balls movable in axially aligned grooves.

* * * * *